(12) United States Patent
Ramaswamy et al.

(10) Patent No.: US 10,826,968 B1
(45) Date of Patent: Nov. 3, 2020

(54) CONTROLLED DISTRIBUTION OF FILES BASED ON DESIGNATED MACHINE FEED TYPE

(71) Applicant: EMC IP Holding Company LLC, Hopkinton, MA (US)

(72) Inventors: Latha Ramaswamy, Marlboro, MA (US); Adel Hanna, North Grafton, MA (US); John Gulbrandsen, Natick, MA (US); Praveen Tyagi, Westborough, MA (US); Ramesh Makkena, East Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 372 days.

(21) Appl. No.: 15/802,559

(22) Filed: Nov. 3, 2017

(51) Int. Cl.
*G06F 16/17* (2019.01)
*G06F 16/172* (2019.01)
*G06F 16/18* (2019.01)
*H04L 29/08* (2006.01)

(52) U.S. Cl.
CPC .......... *H04L 67/06* (2013.01); *G06F 16/172* (2019.01); *G06F 16/173* (2019.01); *G06F 16/1847* (2019.01)

(58) Field of Classification Search
CPC ..... H04L 67/06; G06F 16/172; G06F 16/173; G06F 16/1847
See application file for complete search history.

(56) References Cited

U.S. PATENT DOCUMENTS

| | | | |
|---|---|---|---|
| 8,351,934 B1* | 1/2013 | Schmitt | H04M 3/42178 455/433 |
| 8,893,110 B2* | 11/2014 | Kapadekar | G06F 8/65 717/171 |
| 8,930,067 B1* | 1/2015 | Green | G06Q 20/127 701/33.2 |
| 9,569,587 B2* | 2/2017 | Ansari | H04L 63/083 |
| 9,736,688 B2* | 8/2017 | Li | H04W 12/04 |
| 9,998,914 B2* | 6/2018 | Halmstad | H04W 8/22 |

(Continued)

FOREIGN PATENT DOCUMENTS

| | | | |
|---|---|---|---|
| WO | 9922502 A1 | 5/1999 | |
| WO | 0048375 A1 | 8/2000 | |

*Primary Examiner* — Jorge A Casanova
(74) *Attorney, Agent, or Firm* — Ryan, Mason & Lewis, LLP

(57) ABSTRACT

An apparatus comprises at least one processing platform including a plurality of processing devices. The processing platform is configured to communicate over one or more networks with at least one product site and a plurality of user devices/systems corresponding to respective subscribers. The processing platform is configured to receive from the product site a first file generated by a particular product and having a designated machine feed type, to store the first file in a specified storage location of the processing platform, to determine a plurality of eligible ones of the subscribers for the designated machine feed type, and to generate messages to respective ones of the user devices/systems corresponding to respective ones of the eligible subscribers to indicate that the first file is available for download. The manner in which the first file is stored in the processing platform is altered based on download acknowledgements of the eligible subscribers.

20 Claims, 5 Drawing Sheets

(56) References Cited

U.S. PATENT DOCUMENTS

| | | |
|---|---|---|
| 2006/0126494 A1 | 6/2006 | Dougall et al. |
| 2008/0072278 A1* | 3/2008 | Cohen .................... H04L 67/34 726/1 |
| 2009/0043869 A1 | 2/2009 | Hansen et al. |
| 2015/0074429 A1 | 3/2015 | Johnson |
| 2015/0178061 A1* | 6/2015 | Wang ........................ G06F 8/61 717/172 |
| 2018/0270831 A1* | 9/2018 | Meredith .............. H04W 4/029 |
| 2019/0095510 A1* | 3/2019 | Cruise .................... G06F 11/30 |

* cited by examiner

US 10,826,968 B1

CONTROLLED DISTRIBUTION OF FILES BASED ON DESIGNATED MACHINE FEED TYPE

FIELD

The field relates generally to information processing systems, and more particularly to file distribution in information processing systems.

BACKGROUND

Many information processing systems are configured to distribute files from data sources to various destinations over a network. However, issues can arise in ensuring that files are distributed only to eligible subscribers. For example, in the case of usage data or other types of information automatically generated by information technology (IT) products currently deployed in cloud-based or enterprise-based information processing systems, it is highly desirable to provide real-time management of subscriber access to the corresponding files in a manner that does not consume excessive network bandwidth or other resources. Conventional approaches to controlled file distribution are deficient in this regard.

SUMMARY

Illustrative embodiments provide techniques for controlled file distribution in an information processing system. For example, some embodiments are configured to implement controlled distribution of a given file from a particular product at a product site to eligible subscribers based at least in part on a machine feed type designated for the given file. Such embodiments can advantageously provide significantly improved efficiency in file transfer between product sites and eligible subscribers while also supporting real-time subscription management.

In one embodiment, an apparatus comprises at least one processing platform including a plurality of processing devices. The processing platform is configured to communicate over one or more networks with at least one product site and a plurality of user devices/systems corresponding to respective subscribers. The processing platform is further configured to receive from the product site a first file generated by a particular product and having a designated machine feed type, to store the first file in a specified storage location of the processing platform, to determine a plurality of eligible ones of the subscribers for the designated machine feed type, and to generate messages to respective ones of the user devices/systems corresponding to respective ones of the eligible subscribers to indicate that the first file is available for download. The processing platform is further configured to download the first file to each of at least a subset of the user devices/systems of the respective eligible subscribers responsive to respective download requests received from those user devices/systems, to receive acknowledgements from user devices/systems of the respective eligible subscribers indicating that the first file has been successfully downloaded by those user devices/systems, and to alter a manner in which the first file is stored in the processing platform responsive to the received acknowledgements.

By way of example, altering a manner in which the first file is stored in the processing platform responsive to the received acknowledgements may comprise determining whether or not acknowledgements have been received for all eligible subscribers for the designated machine feed type, and deleting the first file from the specified storage location if acknowledgements have been received for all eligible subscribers for the designated machine feed type.

In some embodiments, the specified storage location comprises a location in a file cache and the first file is deleted from the file cache in conjunction with movement of the file to another storage device of the processing platform. For example, the file can be moved to long-term storage and then deleted from the file cache.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
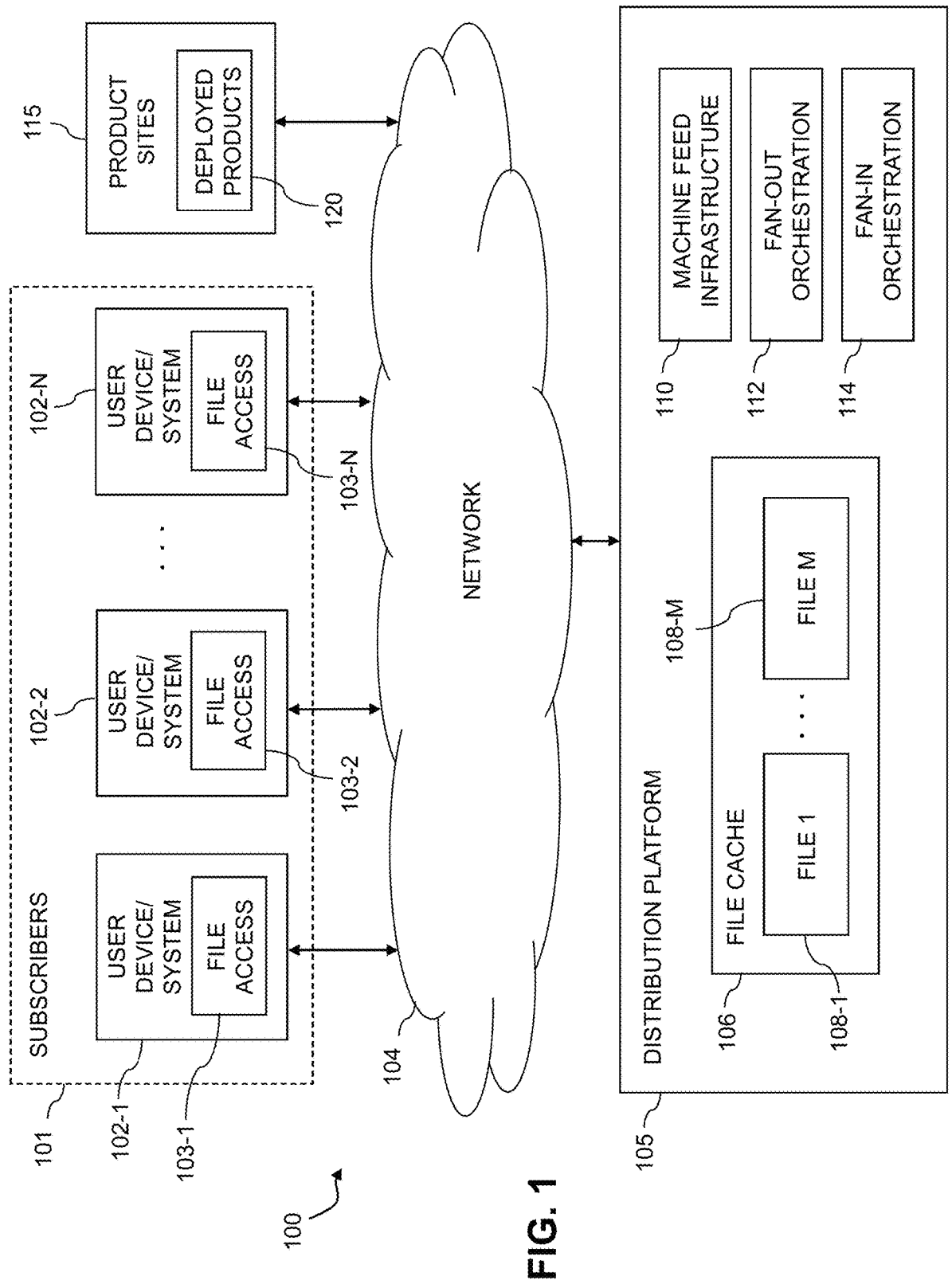
FIG. 1 is a block diagram of an information processing system comprising a processing platform configured for controlled distribution of files based on designated machine feed type in an illustrative embodiment.

FIG. 1 shows an information processing system 100 configured in accordance with an illustrative embodiment. The information processing system 100 comprises machine feed distribution subscribers 101 comprising respective user devices/systems 102-1, 102-2, . . . 102-N that implement respective file access modules 103-1, 103-2, . . . 103-N. The user devices/systems 102 communicate over a network 104 with a distribution platform 105.

As will be described in more detail below, the distribution platform 105 is configured to provide machine feed distribution functionality for the user devices/systems 102. The file access modules 103 implement user-side aspects such as authentication and verification for control of subscriber access to files generated using the machine feed distribution functionality of the distribution platform 105. The machine feed distribution functionality illustratively comprises controlled file distribution from the distribution platform 105 based on designated machine feed types for respective files. It is to be appreciated that embodiments may be used with a wide variety of machine feed types, including, but not limited to, LicenseUsage and ConnectHome machine feed types.

The term "device/system" as utilized herein is intended to refer to a device and/or a system, where a system can be comprised of multiple devices. A given user device/system can therefore comprise a user device associated with at least one user and/or a user system associated with at least one user. The variable N and other similar index variables herein such as M are assumed to be arbitrary positive integers greater than or equal to two.

Examples of user devices include, for example, desktop, laptop or tablet computers, mobile telephones, or other types of processing devices capable of communicating with the distribution platform 105 over the network 104.

Examples of user systems include processing platforms implementing software for tracking product information for one or more users.

The term "user" herein is intended to be broadly construed so as to encompass numerous arrangements of human, hardware, software or firmware entities, as well as combinations of such entities.

Machine feed distribution functionality can be provided for users under a Function-as-a-Service (FaaS) model, although it is to be appreciated that other types of cloud infrastructure arrangements could be used. For example, at least a portion of the machine feed distribution functionality in some embodiments may additionally or alternatively be provided under a Platform-as-a-Service (PaaS) model.

The distribution platform 105 in some embodiments may therefore implement at least a portion of a FaaS environment or a PaaS environment accessible to the user devices/systems 102 over the network 104.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The distribution platform 105 in some embodiments may be implemented as part of cloud infrastructure in the form of a cloud-based system such as an Amazon Web Services (AWS) system. Other examples of cloud-based systems that can be used to provide at least portions of the distribution platform 105 and possibly other portions of system 100 include Google Cloud Platform (GCP) and Microsoft Azure.

The distribution platform 105 in the present embodiment comprises a file cache 106 storing a plurality of files 108-1 through 108-M, also denoted as File 1 through File M, respectively. Also included in the distribution platform 105 is machine feed infrastructure 110, fan-out orchestration module 112 and fan-in orchestration module 114. More detailed examples of these and other components of a distribution platform such as distribution platform 105 will be described below in conjunction with FIG. 3.

Also coupled to the network 104 is a plurality of product sites 115 each comprising one or more deployed products 120. For example, in some embodiments the product sites 115 comprise respective data centers and the deployed products 120 comprise storage systems implemented in the respective data centers. Numerous other types of deployed products 120 can be subject to machine feed distribution in the system 100, including products providing at least one of compute, storage and network functionality within one or more of the product sites 115. The deployed products 120 can comprise hardware, software or firmware products, as well as combinations of such products.

The distribution platform 105 is illustratively configured to receive from a given one of the product sites 115 a first file generated by a particular one of the deployed products 120 and having a designated machine feed type, and to store the first file in a specified storage location of the distribution platform 105. The specified storage location is assumed to comprise a particular location in the file cache 106 of the distribution platform 105, although other types of storage locations may be used. The first file is received and stored in the distribution platform under the control of the machine feed infrastructure 110.

The product site may comprise a customer site of a customer of a provider of the particular product. In such an arrangement, the distribution platform may be implemented by or on behalf of the provider of the particular product.

The above-noted first file is assumed to be generated by the particular product at the product site. For example, the first file may be received in the distribution platform 105 from the particular product via a virtual appliance deployed in conjunction with the particular product at the product site. In some embodiments, the first file comprises usage data for the particular product at the product site.

The distribution platform 105 is further configured to determine a plurality of eligible ones of the subscribers 101 for the designated machine feed type of the first file, to generate messages to respective ones of the user devices/systems 102 corresponding to respective ones of the eligible subscribers to indicate that the first file is available for download, and to download the first file to each of at least a subset of the user devices/systems 102 of the respective eligible subscribers responsive to respective download requests received from those user devices/systems 102. These operations are illustratively performed by cooperative interaction of the machine feed infrastructure 110 and the fan-out orchestration module 112, where "fan-out" in this context refers generally to making the first file accessible to an appropriate eligible subset of the subscribers 101 over the network 104.

Determining a plurality of eligible ones of the subscribers 101 for the designated machine feed type in some embodiments comprises determining the eligible subscribers based at least in part on at least one pre-defined criterion established for the designated machine feed type. Different pre-defined criteria are established for the designated machine feed type for different ones of the eligible subscribers. Moreover, at least a portion of one or more of the pre-defined criteria is dynamically reconfigurable so as to provide real-time subscription management for the eligible subscribers.

A given one of the messages generated by the distribution platform 105 to one of the user devices/systems 102 illustratively comprises a notification message that includes a uniform resource locator (URL) from which the first file can be downloaded by the user device/system of the corresponding eligible subscriber. Distribution of such notification messages is implemented using a messaging framework that is part of the distribution platform 105. For example, the fan-out orchestration module 112 may incorporate or be otherwise associated with one or more messaging frameworks.

The messaging framework may require various user-side access control mechanisms for controlling subscriber access to notification messages. For example, security functionality such as authentication and/or verification of subscriber identity may be required in a given implementation and provided at least in part utilizing file access modules 103 of the respective user devices/systems 102.

The fan-out orchestration module 112 in some embodiments is configured to control the operation of a plurality of subscriber queues associated with respective ones of the subscribers. The subscriber queues are illustratively implemented as part of the above-noted messaging framework of the distribution platform 105.

In some embodiments, a single instance of the first file is received over the network 104 from the particular product at the product site, and that single instance of the first file is replicated within the distribution platform 105 to respective ones of the subscriber queues of the eligible subscribers so as to be downloadable from those subscriber queues by the user devices/systems 102 of the eligible subscribers.

The distribution platform 105 receives acknowledgements from user devices/systems 102 of the respective eligible subscribers indicating that the first file has been successfully downloaded by those user devices/systems 102, and alters a manner in which the first file is stored in the distribution platform 105 responsive to the received acknowledgements. These operations are illustratively performed by cooperative interaction of the machine feed infrastructure 110 and the fan-in orchestration module 114, where "fan-in" in this context refers generally to receipt and processing of acknowledgements from an appropriate eligible subset of the subscribers 101 over the network 104.

The fan-in orchestration module 114 is assumed to control the operation of an acknowledgement queue configured to store the received acknowledgements from user devices/systems 102 of respective ones of the eligible subscribers. The acknowledgement queue is illustratively implemented as part of the above-noted messaging framework of the distribution platform 105.

As indicated above, the distribution platform 105 alters a manner in which the first file is stored in the distribution platform 105 responsive to the received acknowledgements. For example, the distribution platform 105 may determine whether or not acknowledgements have been received for all eligible subscribers for the designated machine feed type, and deleting the first file from the specified storage location if acknowledgements have been received for all eligible subscribers for the designated machine feed type. As another example, the distribution platform 105 may compare a number of acknowledgements received from respective eligible subscribers for the designated machine feed type to a threshold, and delete the first file from the specified storage location if the number of acknowledgements is greater than or equal to the threshold.

Numerous alternative arrangements not involving the deletion of the first file may be used. For example, the distribution platform 105 may determine whether or not acknowledgements have been received for all eligible subscribers for the designated machine feed type, and migrate the first file from file cache 106 to backend storage if acknowledgements have been received for all eligible subscribers for the designated machine feed type. As another example, the distribution platform 105 may compare a number of acknowledgements received from respective eligible subscribers for the designated machine feed type to a threshold, and migrate the first file from file cache 106 to backend storage if the number of acknowledgements is greater than or equal to the threshold.

The foregoing are only examples, and the distribution platform 105 can undertake additional or alternative alterations in the manner in which the first file is stored in the distribution platform 105 responsive to the received acknowledgements.

Additional files generated by deployed products 120 at product sites 115 are handled in a manner similar to that described for the first file. References herein to a "first file" should be understood as broadly referring to any of the files that may be generated by one or more deployed products for machine feed distribution, and should not be construed as requiring any particular numerical ordering of files.

It is assumed that the distribution platform 105 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The distribution platform 105 is assumed to comprise one or more storage systems configured to implement file cache 106 and associated backend storage as well as other types of storage devices.

Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system of distribution platform 105 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

The distribution platform 105 is an example of what is more generally referred to herein as a "processing platform."

The term "processing platform" as used herein is intended to be broadly construed so as to encompass, by way of illustration and without limitation, multiple sets of processing devices and one or more associated storage systems that are configured to communicate over one or more networks.

As a more particular example, the machine feed infrastructure 110, fan-out orchestration module 112 and fan-in orchestration module 114 can each be implemented in the form of one or more LXCs running on one or more VMs. Other arrangements of one or more processing devices of a processing platform can be used to implement the machine feed infrastructure 110, fan-out orchestration module 112 and fan-in orchestration module 114 as well as other components of the distribution platform 105. Other portions of the system 100 can similarly be implemented using one or more processing devices of at least one processing platform.

Distributed implementations of the system 100 are possible, in which certain components of the system reside in one data center in a first geographic location while other components of the system 100 reside in one or more other data centers in one or more other geographic locations that are potentially remote from the first geographic location. Thus, it is possible in some implementations of the system 100 for different portions of the distribution platform 105 to reside in different data centers. Numerous other distributed implementations of the distribution platform 105 are possible.

Although illustratively shown as being implemented within the distribution platform 105, components such as machine feed infrastructure 110 in other embodiments can be implemented at least in part externally to the distribution platform 105. For example, such components can each be implemented at least in part within another system element or at least in part utilizing one or more stand-alone components coupled to the network 104.

It is to be appreciated that these and other features of illustrative embodiments are presented by way of example only, and should not be construed as limiting in any way.

Accordingly, different numbers, types and arrangements of system components such as file cache 106, machine feed infrastructure 110, fan-out orchestration module 112 and fan-in orchestration module 114 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments functionality for machine feed distribution can be offered to cloud infrastructure customers or other users as part of a FaaS or PaaS offering.

The operation of the information processing system 100 will now be described in further detail with reference to the flow diagram of FIG. 2. The process as shown includes steps 200 through 210, and is suitable for use in the system 100 but is more generally applicable to other types of information processing systems comprising at least one processing platform configured to provide machine feed distribution functionality. The process is more particularly assumed to be implemented in at least one processing platform configured to communicate over one or more networks with at least one product site and a plurality of user devices/systems corresponding to respective subscribers.

In step 200, a file generated by a particular product and having a designated machine type is received from a product site and stored in a file cache. The file cache is illustratively deployed on a distribution platform or other type of processing platform that implements at least portions of the FIG. 2 process.

In step 202, eligible subscribers are determined for the designated machine feed type. For example, determining eligible subscribers for the designated machine feed type may comprise determining the eligible subscribers based at least in part on at least one pre-defined criterion established for the designated machine feed type. Different criteria may be associated with different eligible subscribers.

In step 204, messages are generated to user devices/systems corresponding to respective eligible subscribers to indicate that the file is available for download. The messages illustratively comprise notification messages generated as part of a messaging framework that also implements queuing components.

In step 206, the file is downloaded to user devices/systems of eligible subscribers responsive to download requests received from those user devices/systems.

In step 208, a determination is made as to whether or not download acknowledgements ("acks") have been received from user devices/systems of all eligible subscribers. A given such download acknowledgement indicates that the file has been successfully downloaded by the user device/system of the corresponding eligible subscriber. If download acknowledgements have not been received from user devices/systems of all eligible subscribers, the process returns to step 206 to receive one or more additional download acknowledgements. Otherwise, the process moves to step 210.

In step 210, the file is deleted from the file cache, and the process returns to step 200 to process additional files generated by particular products and having designated machine feed types. Other types of alterations in the manner in which a given machine feed distribution file is stored in the processing platform can be used in other embodiments. For example, after acknowledgements have been received for all eligible subscribers for the designated machine feed type, the file may be moved from the file cache to backend storage or another type of long-term storage, such as a cloud-based object store.

Figure 2:
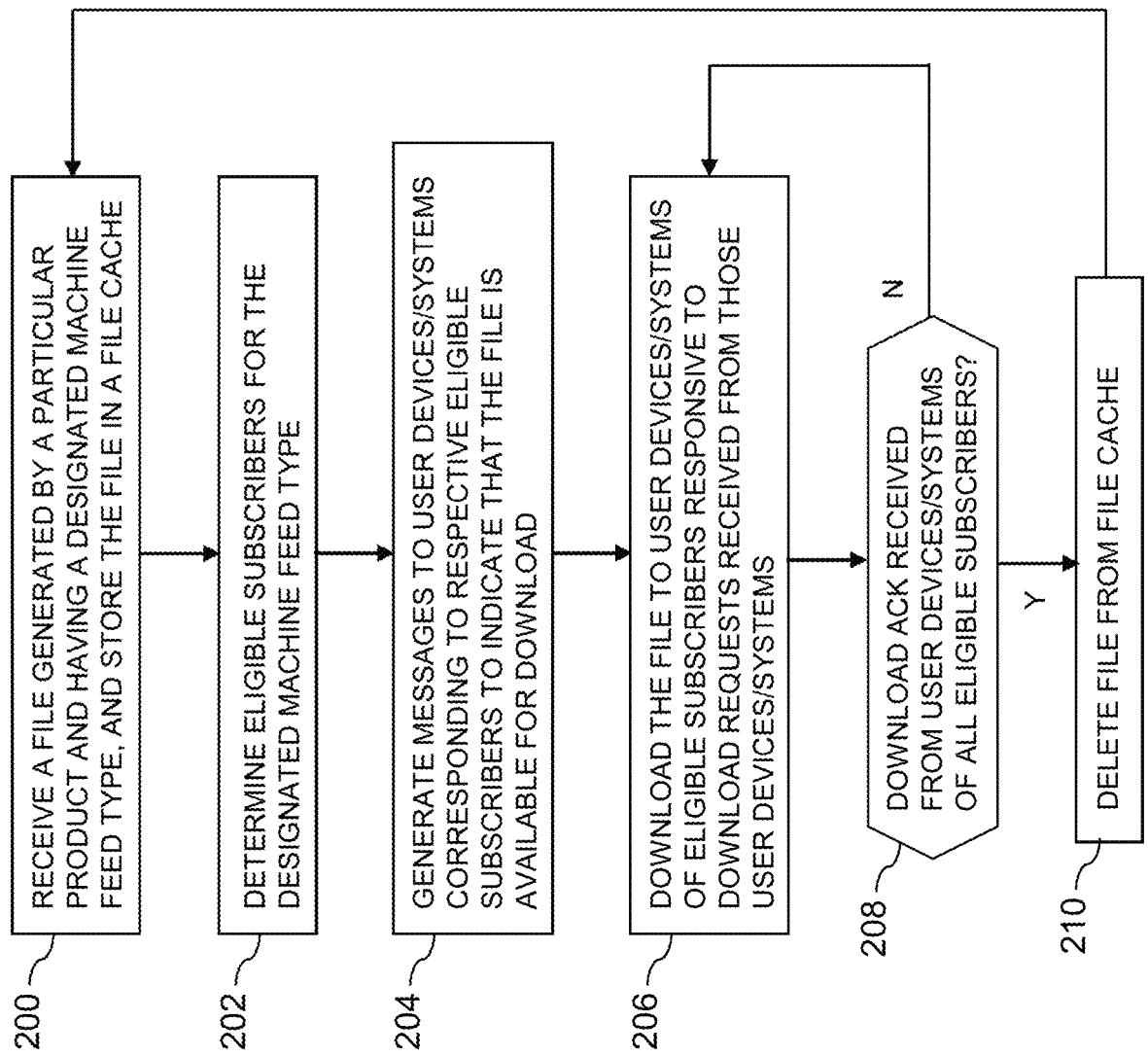
FIG. 2 is a flow diagram of a process for controlled distribution of files based on designated machine feed type in an illustrative embodiment.

It is to be appreciated that the FIG. 2 process and other machine feed distribution functionality described above can be adapted for use with other types of information systems comprising one or more processing platforms.

The particular processing operations and other system functionality described in conjunction with the flow diagram of FIG. 2 are therefore presented by way of illustrative example only, and should not be construed as limiting the scope of the disclosure in any way. Alternative embodiments can use other types of processing operations involving machine feed distribution. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another, in order to implement a plurality of different machine feed distribution instances for different files within a processing platform of a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

An additional illustrative embodiment incorporating functionality for machine feed distribution will now be described with reference to FIG. 3.

Figure 3:
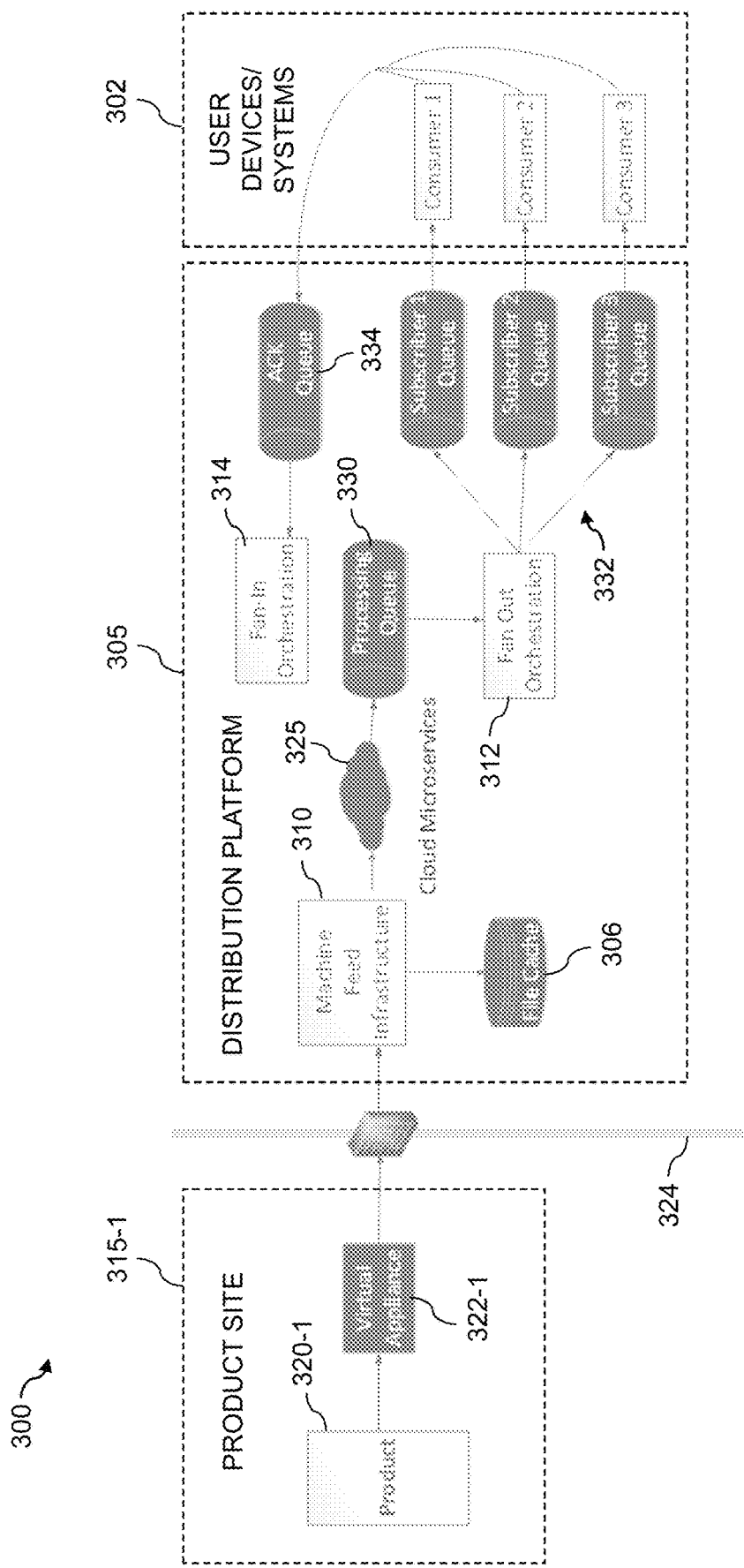
FIG. 3 is a block diagram of another information processing system implementing functionality for controlled distribution of files based on designated machine feed type in an illustrative embodiment.

FIG. 3 shows another information processing system 300 comprising a distribution platform providing machine feed distribution functionality including functionality for controlled distribution of files based on designated machine feed type. In the information processing system 300, user devices/systems 302 are coupled to a distribution platform 305 via one or more networks that are not explicitly shown.

The distribution platform 305 comprises a file cache 306, machine feed infrastructure 310, a fan-out orchestration module 312 and a fan-in orchestration module 314, all of which operate in a manner similar to that previously described for the respective corresponding components 106, 110, 112 and 114 of the FIG. 1 embodiment.

The system 300 further comprises a product site 315-1 at which there is deployed a particular product 320-1. The product site 315-1 illustratively comprises a customer site of a customer of a provider of the particular product 320-1. The distribution platform 305 may be implemented by or on behalf of the provider of the particular product 320-1. For example, the product 320-1 may comprise a Dell EMC storage array or other Dell EMC storage product of the type described elsewhere herein.

Such a product is illustratively deployed at a customer site, with files originating from that product being made available for download based on pre-defined criteria to eligible subscribers using machine feed distribution functionality of the distribution platform 305. The criteria for a particular machine feed type could be unique for different subscribers. More particularly, different pre-defined criteria can be established for the designated machine feed type for different ones of the eligible subscribers. At least a portion of one or more of the pre-defined criteria may be dynamically reconfigurable so as to provide real-time subscription management for the eligible sub scribers.

The user devices/systems 302 illustratively correspond to respective consumers, including consumers denoted Consumer 1, Consumer 2 and Consumer 3. These are examples of potentially eligible subscribers of a file generated by deployed product 320-1.

A given file generated by the product 320-1 deployed at the product site 315-1 is received in the distribution platform 305 via a virtual appliance 322-1 deployed in conjunction with the particular product 320-1 at the product site 315-1. The virtual appliance 322-1 is separated from the distribution platform 305 by a firewall 324. The firewall 324 is part of at least one network interconnecting product site 315-1 with the distribution platform 305. The given file may comprise usage data for the particular product 320-1 at the product site 315-1, although numerous other types of data suitable for machine feed distribution can be included in the file. The file can be of any format with no specific size limitations.

The distribution platform 305 further comprises cloud microservices 325 that are utilized by the machine feed infrastructure 310 to control provision of files from the file cache 306 to a processing queue 330. The cloud microservices 325 illustratively comprise FaaS services of the type described elsewhere herein. The processing queue 330 drives fan-out orchestration module 312 which interacts with subscriber queues 332, including individual queues for respective subscribers denoted as Subscriber 1, Subscriber 2 and Subscriber 3.

The fan-out orchestration module 312 determines eligible subscribers for the designated machine feed type of the file being processed. The eligible subscribers are determined based at least in part on the one or more pre-defined criteria established for the designated machine feed type. The eligible subscribers are then notified about the incoming machine feed distribution file through a messaging framework that illustratively comprises the subscriber queues 332 and an associated acknowledgement queue 334. Eligible subscribers can download the file from a URL that is included in notification messages sent to those subscribers via their respective subscriber queues 332.

After successfully downloading the file from the URL, the eligible subscribers post respective replies to the acknowledgement queue 334. Such replies are also referred to herein as download acknowledgements. As mentioned previously, the eligible subscribers in this embodiment more particularly include respective consumers associated with the user devices/systems 302.

Download acknowledgements from respective ones of the consumers associated with the user devices/systems 302 are collected in the acknowledgement queue 334 and are processed by the fan-in orchestration module 314. The fan-in orchestration module 314 deletes the file from the file cache 306 only when all eligible subscribers have acknowledged the successful downloading of the file.

Although not explicitly illustrated in the figure, one or more outputs of the fan-in orchestration module 314 characterizing the number and type of received acknowledgements are assumed to be fed back to one or more of the machine feed infrastructure 310, the cloud microservices 325 and the processing queue 330. Such an arrangement facilitates the controlled deletion of the file from the file cache 306.

As mentioned elsewhere herein, the file may be migrated from the file cache 306 to backend storage of the distribution platform 305 responsive to an indication that all eligible subscribers have acknowledged successful downloading of the file for which notification messages were received from their respective ones of the subscriber queues 332. Other types of alterations in the manner in which the file is stored in the system 300 can be made. For example, the file can be migrated from a fast tier to a capacity tier in a multi-tier storage system responsive to the above-noted indication.

Like other embodiments described previously, the particular components, features and functionality of the FIG. 3 embodiment are presented by way of illustrative example only, and should not be construed as limiting in any way.

Illustrative embodiments of systems with controlled file distribution using machine feed distribution functionality as disclosed herein can provide a number of significant advantages relative to conventional arrangements.

For example, some embodiments are configured to implement controlled distribution of a given file from a particular product at a product site to eligible subscribers based at least in part on a machine feed type designated for the given file.

Such embodiments can advantageously provide significantly improved efficiency in file transfer between product sites and eligible subscribers while also supporting real-time subscription management.

Illustrative embodiments can eliminate the need for multiple separate file transfers to respective different subscribers and thereby conserve network bandwidth and other system resources for subscribers as well as product providers. These embodiments also reduce the likelihood of failures, which would otherwise tend to significantly increase with an increasing number of multiple separate file transfers.

Moreover, some embodiments allow dynamically-varying sets of multiple eligible subscribers to take advantage of an existing incoming machine feed, such as a machine feed providing product usage data, without the need for any changes to file distribution control at the product site.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the distribution platform 105 or portions thereof are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as AWS S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
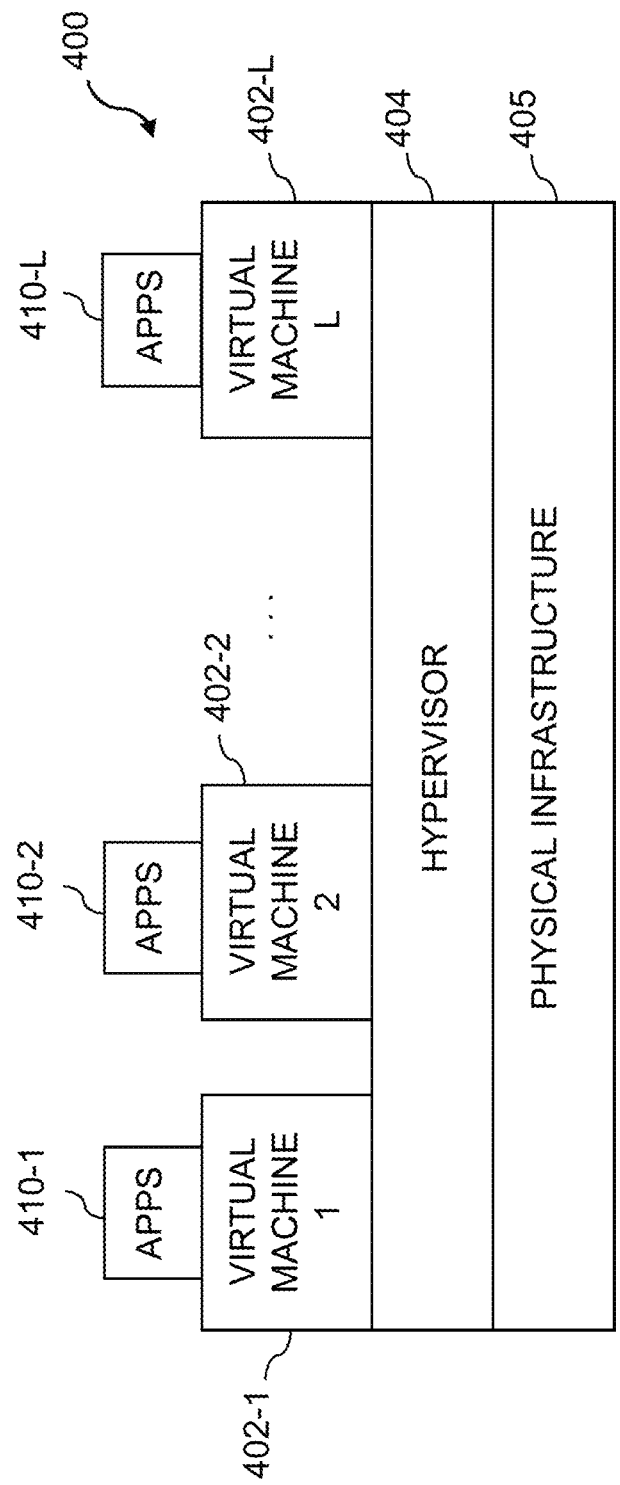
FIGS. 4 and 5 show examples of processing platforms that may be utilized to implement at least a portion of an information processing system in illustrative embodiments.
Figure 5:
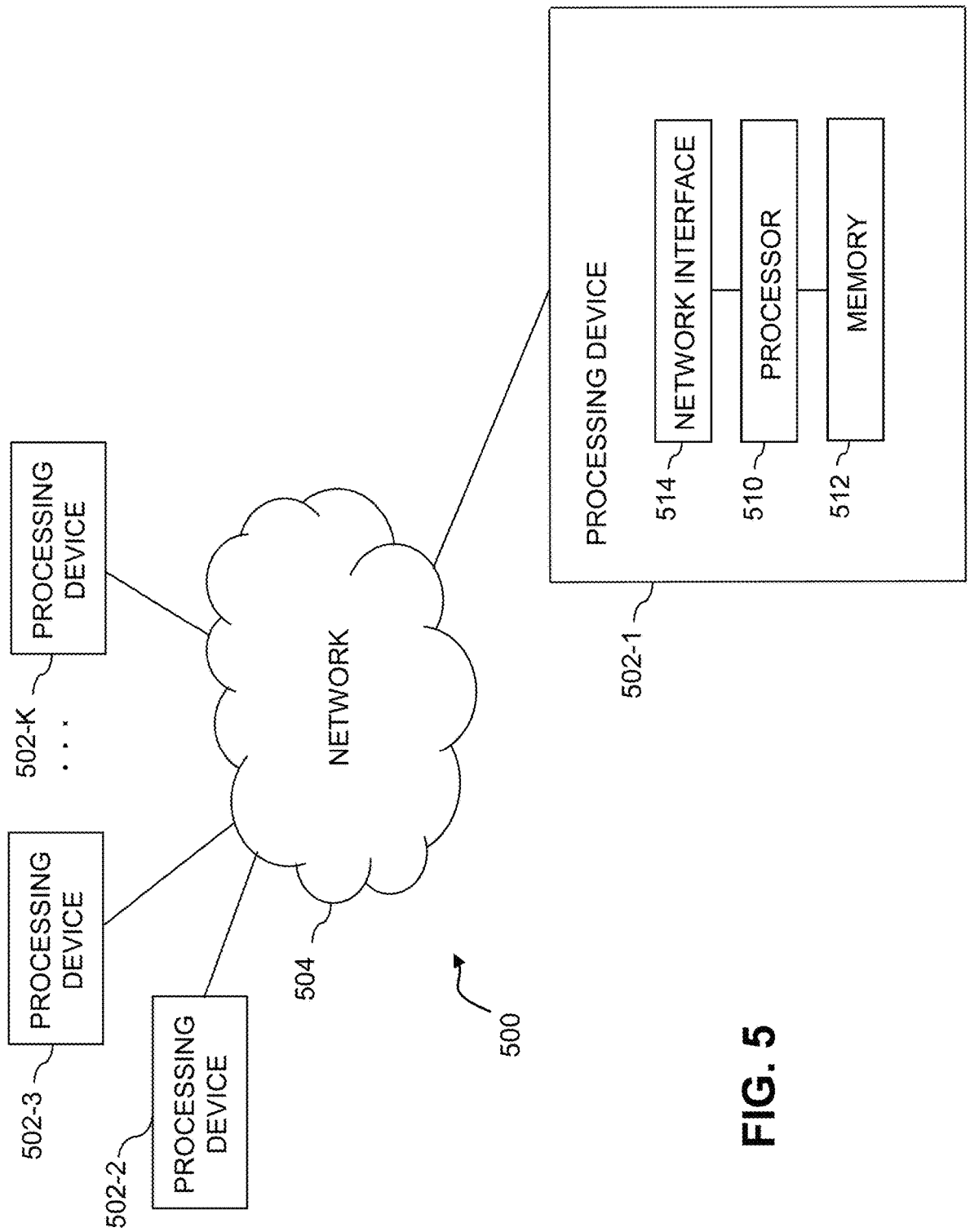

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 404 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the distribution platform 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, user devices/systems, distribution platforms, machine feed infrastructure, orchestration modules, messaging frameworks, product sites and deployed products. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   the processing platform being configured to communicate over one or more networks with at least one product site and a plurality of user devices/systems corresponding to respective subscribers;
   the processing platform being further configured:
   to receive from the product site a first file generated by a particular product and having a designated machine feed type;
   to store the first file in a specified storage location of the processing platform;
   to determine a plurality of eligible ones of the subscribers for the designated machine feed type;
   to generate messages to respective ones of the user devices/systems corresponding to respective ones of the eligible subscribers to indicate that the first file is available for download;
   to download the first file to each of at least a subset of the user devices/systems of the respective eligible subscribers responsive to respective download requests received from those user devices/systems;
   to receive acknowledgements from user devices/systems of the respective eligible subscribers indicating that the first file has been successfully downloaded by those user devices/systems; and
   to alter a manner in which the first file is stored in the processing platform responsive to the received acknowledgements;
   wherein the processing platform further comprises a plurality of subscriber queues associated with respective ones of the subscribers and wherein a single instance of the first file is received over the one or more networks from the particular product at the product site but is replicated within the processing platform to respective ones of the subscriber queues of the eligible subscribers so as to be downloadable from those subscriber queues by user devices/systems of the eligible subscribers.

2. The apparatus of claim 1 wherein the specified storage location comprises a location in a file cache of the processing platform.

3. The apparatus of claim 1 wherein the product site comprises a customer site of a customer of a provider of the particular product and the processing platform is implemented by or on behalf of the provider of the particular product.

4. The apparatus of claim 1 wherein the first file is generated by the particular product at the product site.

5. The apparatus of claim 1 wherein the first file is received in the processing platform from the particular product via a virtual appliance deployed in conjunction with the particular product at the product site.

6. The apparatus of claim 1 wherein the first file comprises usage data for the particular product at the product site.

7. The apparatus of claim 1 wherein determining a plurality of eligible ones of the subscribers for the designated machine feed type further comprises determining the eligible subscribers based at least in part on at least one pre-defined criterion established for the designated machine feed type.

8. The apparatus of claim 7 wherein different pre-defined criteria are established for the designated machine feed type for different ones of the eligible subscribers.

9. The apparatus of claim 7 wherein at least a portion of said at least one pre-defined criterion is dynamically reconfigurable so as to provide real-time subscription management for the eligible subscribers.

10. The apparatus of claim 1 wherein the processing platform further comprises an acknowledgement queue configured to store the received acknowledgements from user devices/systems of respective ones of the eligible subscribers.

11. The apparatus of claim 1 wherein altering a manner in which the first file is stored in the processing platform responsive to the received acknowledgements comprises:
determining whether or not acknowledgements have been received for all eligible subscribers for the designated machine feed type; and
deleting the first file from the specified storage location if acknowledgements have been received for all eligible subscribers for the designated machine feed type.

12. The apparatus of claim 1 wherein altering a manner in which the first file is stored in the processing platform responsive to the received acknowledgements comprises:
comparing a number of acknowledgements received from respective eligible subscribers for the designated machine feed type to a threshold; and
deleting the first file from the specified storage location if the number of acknowledgements is greater than or equal to the threshold.

13. The apparatus of claim 1 wherein a given one of the messages comprises a notification message that includes a uniform resource locator from which the first file can be downloaded by the user device/system of the corresponding eligible subscriber.

14. A method comprising:
configuring at least one processing platform to communicate over one or more networks with at least one product site and a plurality of user devices/systems corresponding to respective subscribers;
receiving from the product site a first file generated by a particular product and having a designated machine feed type;
storing the first file in a specified storage location of the processing platform;
determining a plurality of eligible ones of the subscribers for the designated machine feed type;
generating messages to respective ones of the user devices/systems corresponding to respective ones of the eligible subscribers to indicate that the first file is available for download;
downloading the first file to each of at least a subset of the user devices/systems of the respective eligible subscribers responsive to respective download requests received from those user devices/systems;
receiving acknowledgements from user devices/systems of the respective eligible subscribers indicating that the first file has been successfully downloaded by those user devices/systems; and
altering a manner in which the first file is stored in the processing platform responsive to the received acknowledgements;
wherein the processing platform comprises a plurality of subscriber queues associated with respective ones of the subscribers and wherein a single instance of the first file is received over the one or more networks from the particular product at the product site but is replicated within the processing platform to respective ones of the subscriber queues of the eligible subscribers so as to be downloadable from those subscriber queues by user devices/systems of the eligible subscribers; and
wherein the method is performed by a plurality of processing devices of the processing platform.

15. The method of claim 14 wherein determining a plurality of eligible ones of the subscribers for the designated machine feed type further comprises determining the eligible subscribers based at least in part on at least one pre-defined criterion established for the designated machine feed type.

16. The method of claim 14 wherein altering a manner in which the first file is stored in the processing platform responsive to the received acknowledgements comprises:
determining whether or not acknowledgements have been received for all eligible subscribers for the designated machine feed type; and
deleting the first file from the specified storage location if acknowledgements have been received for all eligible subscribers for the designated machine feed type.

17. A computer program product comprising a non-transitory processor-readable storage medium having stored therein program code of one or more software programs, wherein the program code when executed by at least one processing platform comprising a plurality of processing devices, the processing platform being configured to communicate over one or more networks with at least one product site and a plurality of user devices/systems corresponding to respective subscribers, causes said at least one processing platform:
to receive from the product site a first file generated by a particular product and having a designated machine feed type;
to store the first file in a specified storage location of the processing platform;
to determine a plurality of eligible ones of the subscribers for the designated machine feed type;
to generate messages to respective ones of the user devices/systems corresponding to respective ones of the eligible subscribers to indicate that the first file is available for download;
to download the first file to each of at least a subset of the user devices/systems of the respective eligible subscribers responsive to respective download requests received from those user devices/systems;

to receive acknowledgements from user devices/systems of the respective eligible subscribers indicating that the first file has been successfully downloaded by those user devices/systems; and to alter a manner in which the first file is stored in the processing platform responsive to the received acknowledgements;

wherein the processing platform further comprises a plurality of subscriber queues associated with respective ones of the subscribers and wherein a single instance of the first file is received over the one or more networks from the particular product at the product site but is replicated within the processing platform to respective ones of the subscriber queues of the eligible subscribers so as to be downloadable from those subscriber queues by user devices/systems of the eligible subscribers.

18. The computer program product of claim 17 wherein determining a plurality of eligible ones of the subscribers for the designated machine feed type further comprises determining the eligible subscribers based at least in part on at least one pre-defined criterion established for the designated machine feed type.

19. The computer program product of claim 17 wherein altering a manner in which the first file is stored in the processing platform responsive to the received acknowledgements comprises:

determining whether or not acknowledgements have been received for all eligible subscribers for the designated machine feed type; and deleting the first file from the specified storage location if acknowledgements have been received for all eligible subscribers for the designated machine feed type.

20. The computer program product of claim 17 wherein altering a manner in which the first file is stored in the processing platform responsive to the received acknowledgements comprises:

comparing a number of acknowledgements received from respective eligible subscribers for the designated machine feed type to a threshold; and deleting the first file from the specified storage location if the number of acknowledgements is greater than or equal to the threshold.

* * * * *